(12) United States Patent
Kloeppner et al.

(10) Patent No.: US 7,562,176 B2
(45) Date of Patent: Jul. 14, 2009

(54) APPARATUS AND METHODS FOR CLUSTERING MULTIPLE INDEPENDENT PCI EXPRESS HIERARCHIES

(75) Inventors: John R. Kloeppner, Buhler, KS (US); Dennis E. Gates, Wichita, KS (US); Robert E. Stubbs, Longmont, CO (US); Mohamad H. El-Batal, Westminster, CO (US); Russell J. Henry, Wichita, KS (US); Charles E. Nichols, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 49 days.

(21) Appl. No.: 11/680,366

(22) Filed: Feb. 28, 2007

(65) Prior Publication Data

US 2008/0209099 A1 Aug. 28, 2008

(51) Int. Cl.
*G06F 13/36* (2006.01)
*G06F 13/20* (2006.01)
*G06F 13/00* (2006.01)
*G06F 15/16* (2006.01)

(52) U.S. Cl. .................... 710/314; 710/306; 710/313; 710/316; 709/218; 709/229

(58) Field of Classification Search .............. 710/30, 710/306, 313–314, 316, 317, 2, 3, 9, 300; 709/217–218, 229, 238, 245, 219
See application file for complete search history.

(56) References Cited

U.S. PATENT DOCUMENTS

2003/0086421 A1* 5/2003 Awsienko et al. .......... 370/387
2004/0123014 A1* 6/2004 Schaefer et al. ............. 710/313
2004/0172494 A1* 9/2004 Pettey et al. ................ 710/305
2006/0282603 A1* 12/2006 Onufryk et al. ............. 710/312
2007/0098001 A1* 5/2007 Thomas ...................... 370/422
2007/0204095 A1* 8/2007 Sandy et al. ................ 710/316
2007/0234118 A1* 10/2007 Sardella et al. .............. 714/23
2008/0147887 A1* 6/2008 Freimuth et al. .............. 710/1

OTHER PUBLICATIONS

Rao, Navneet. "Advanced Switching Technical Overview". ASI-SIG. Xilinx, Inc. Available Jun. 30, 2006. pp. 1-45.*

* cited by examiner

*Primary Examiner*—Thomas J Cleary
(74) *Attorney, Agent, or Firm*—Duft Bornsen & Fishman LLP

(57) ABSTRACT

Apparatus, systems and methods for clustering multiple PCI Express hierarchies to enable access of components in different hierarchies. Each PCI Express hierarchy includes a root device as well as a cluster port for coupling each hierarchy to each other hierarchy of a physical cluster through a PCI Express switched fabric. Memory addresses and transaction IDs are re-mapped by the cluster port of each hierarchy to partition the PCI Express space of the system of multiple hierarchies. A first portion of the partitioned space is reserved for access to local components within a hierarchy. A second portion of the space is used to access remote components of other hierarchies from within a different first hierarchy. The address and transaction ID values exchanged in such remote transactions are re-mapped and used by the cluster port of each hierarchy to route exchanges between hierarchies using standard PCIe root devices, endpoint devices, and switches.

20 Claims, 8 Drawing Sheets

APPARATUS AND METHODS FOR CLUSTERING MULTIPLE INDEPENDENT PCI EXPRESS HIERARCHIES

BACKGROUND

1. Field of the Invention

The present invention relates to PCI Express system architectures and more specifically relates to modifications of the PCI Express architecture to enable interconnection of multiple independent PCI Express hierarchies to form a cluster of interconnected PCI Express hierarchies that may share access to endpoint devices in any of the clustered hierarchies.

2. Discussion of Related Art

The peripheral computer interconnect standards ("PCI") have been popular interconnect standards for computing systems for many years. A more recent variant of the PCI architecture called "PCI Express" ("PCIe") extends the family of PCI interconnect standards to include high speed serial exchange for bus transactions between master and slave devices within a system. In general, a system utilizing PCI interconnections (including PCIe) has a designated root device responsible for initially configuring parameters of the system and of the PCI interconnect between components of the system. In like manner, PCIe standards include such a root device that configures various aspects of the PCIe interconnect pathways as well as configuration parameters of the various endpoint devices within the system. The high speed serial nature of PCIe protocols and media allow for use of high speed switching devices as are generally known in the networking fields. Thus endpoint devices in a hierarchy with a root device may be more widely distributed and remain connected with other devices in the hierarchy through the PCIe switch/switches (i.e., a PCIe switched fabric connection). The root device in a PCIe hierarchy typically configures the switches of the fabric to allow switching of transactions based on various parameters of the applied transactions.

In parallel bus structure PCI systems as well as high speed serial PCIe systems, it is common that a system containing a single root device and any number of endpoint devices is referred to as a single PCI hierarchy. The root device of such a single hierarchy, as noted above, is generally responsible for configuring the interconnect media and protocols as well as various configuration attributes of the endpoint devices. Once so configured, various devices may temporarily assume the role of a master device in initiating a transaction with a slave device within the same hierarchy.

In older parallel bus structure PCI hierarchies, each PCI hierarchy is generally precluded from communicating with components of a second PCI hierarchy having another root device. Rather, each hierarchy is generally segregated and independent such that it has a single root device and its associated collection of endpoint devices. Such segregation of PCI hierarchies helps avoid problems with multiple root devices each attempting to initialize segments of the PCI bus structure and/or attempting to initialize the same endpoint devices with different configuration information. However, such segregation also generally precludes one hierarchy from easily accessing components within another hierarchy such that each hierarchy may share access to endpoint devices to thereby improve utilization of the processing and communication power therein. Though PCI bridge devices are known to allow coupling of otherwise segregated PCI bus segments, such devices add substantial cost and management complexity to a system.

Even with the switchable, serialized communications of the PCIe media and protocols, it is common to segregate PCI hierarchies such that one hierarchy cannot easily access endpoint devices in a second hierarchy. In fact, current PCIe standards and specifications preclude multiple root devices in a system and instead define a system as including only a single root device—i.e., a single hierarchy includes a single root device and its associated endpoint devices. Thus, multiple hierarchies are each operable completely independent of any other hierarchy and cannot share access to components in different hierarchies that each have a corresponding root device.

Although not presently standardized in a published, industry-adopted specification, recent developments by the PCISIG (PCI special interest group—the de facto industry standards organization defining PCI architectures) have begun to define an architecture that allows for multiple root devices in a PCIe system. Multi-root I/O structures have been proposed in the PCISIG such that multiple hierarchies may be physically integrated and physically interconnected within a single system—i.e., each hierarchy having a single specified root device and having associated endpoint devices all devices sharing common physical, switched connections. However, even these evolving standards still logically segregate the collection of endpoint devices such that each endpoint device may be accessed only by a single hierarchy within the system. In other words, each device is a member of a single hierarchy that includes a collection of devices associated only with that one hierarchy and its corresponding root device. Although multiple endpoint devices may share a single physical device and share a common interconnect they must be assigned to different hierarchies. Thus, although multiple hierarchies may be physically interconnected, no sharing of access is permitted between the various hierarchies of the system. Rather, the enhanced PCIe devices and switches logically segregate the devices—each to its own hierarchy—though the devices may share common physical communication paths through enhanced switching devices. In addition, for each hierarchy requiring access to a particular physical device there must be a separate logical endpoint device provide for each hierarchy. This requirement restricts the number of hierarchies that can access a physical device to the number of logical endpoint devices provided by the physical device.

Further, the evolving standards for multi-root virtualization and sharing evolving within the PCISIG involve substantial changes in PCI Express compliant switches and devices. The enhanced switches and devices are required for exchange of enhanced, modified PCIe packetized transactions. In other words, root devices and PCIe switches must be multi-root aware ("MRA" as defined in the evolving proposed standards) to allow the multiple hierarchies to coexist within a system sharing common physical attachments through enhanced PCIe switches. The evolving standards of PCISIG are documented at www.pcisig.com and are generally known to those of ordinary skill in the art of PCI system architectures.

To permit sharing of devices among a plurality of hierarchies, present solutions generally entail coupling the hierarchies of the system through other interconnection media and protocols to provide desired sharing of devices among the hierarchies. For example, Fibre Channel, Ethernet, and other well known network connectivity media and protocols may be employed to interconnect the various hierarchies to thereby provide shared access to endpoint devices in each hierarchy of the cluster. However, these and other networking solutions add substantial overhead to the processing for such shared access. Access to a remote device in another hierarchy must first be translated from a PCIe packetized transaction to another protocol for network exchange to the other hierarchy. Such protocol translations can add significant overhead processing to the desired shared access and thus may be practically unusable in high performance applications.

In view of the above discussion it clearly remains a problem to provide for sharing of endpoint devices among a plurality of PCIe hierarchies in a physical cluster each hierarchy having an associated root device.

SUMMARY

The present invention solves the above and other problems, thereby advancing the state of the useful arts, by providing apparatus, systems, and methods for clustering multiple PCIe hierarchies such that each hierarchy may share access to components of other hierarchies in the physical cluster. Each hierarchy includes a cluster port in accordance with features and aspects hereof that translates or re-maps memory addresses and other transaction information exchanged between a first PCIe hierarchy and any other of the plurality of PCIe hierarchies in a multiple hierarchy system. The standard PCI Express space (both memory address space and configuration space) is re-mapped utilizing the cluster port in each hierarchy such that a reserved first portion of the space is used exclusively for local transactions within and each hierarchy while the second portion of the total PCIe space is used to identify transactions to be directed from a first hierarchy to components within a second or remote hierarchy. Re-mapping of the standard PCIe space allows current PCIe architecture devices (root devices, endpoint devices, and PCIe switches) to be utilized without requiring the cost or complexity of the evolving multi-root aware standards proposed by PCISIG. Rather, the cluster port associated with each hierarchy, in accordance with features and aspects hereof, provides requisite re-mapping or translation by partitioning the entire PCIe space into smaller segments or portions. A first portion is associated with local access within each PCIe hierarchy and the remaining portion is used by each hierarchy to reference components within another hierarchy of the multiple PCIe hierarchies.

DETAILED DESCRIPTION OF THE DRAWINGS

Figure 1:
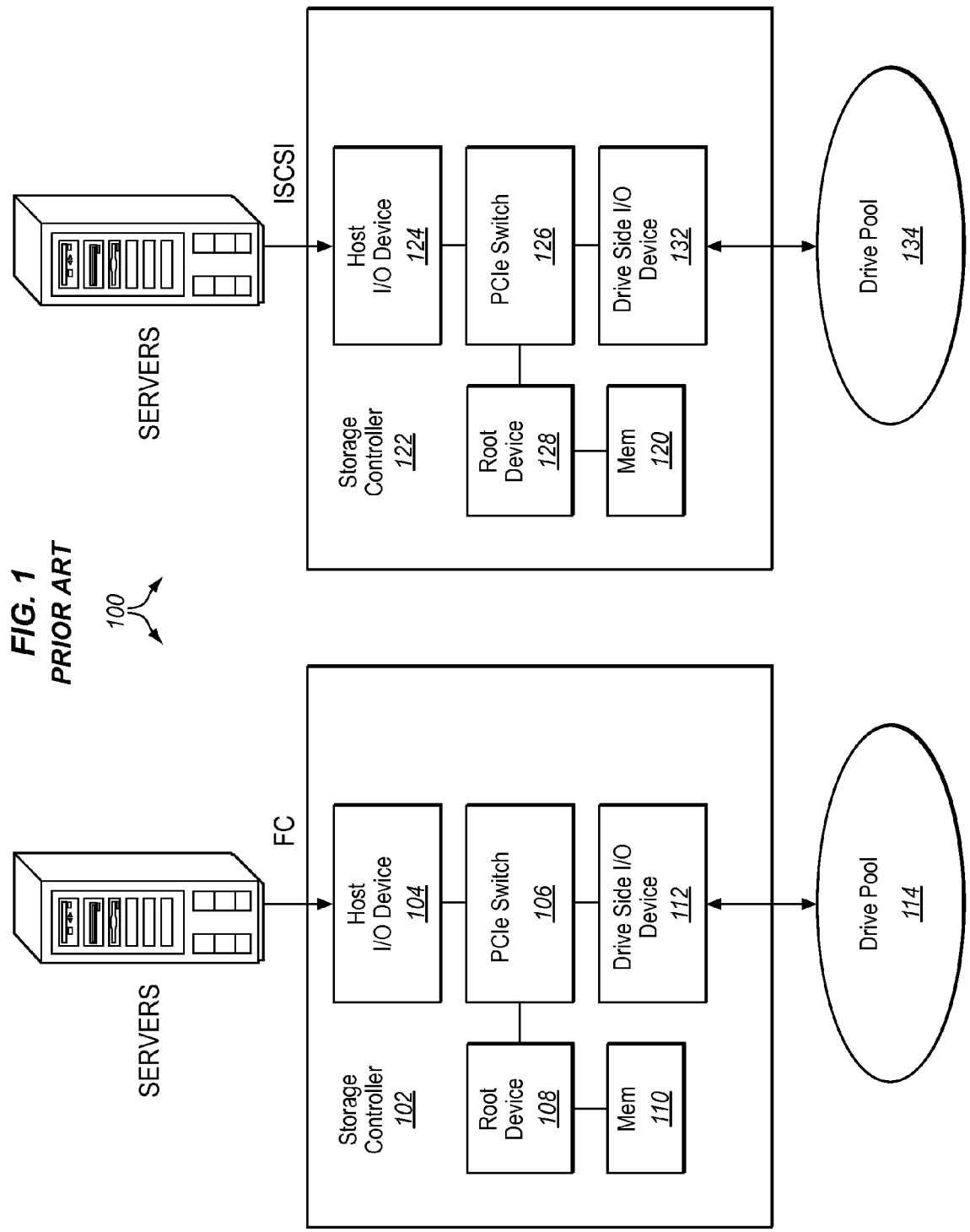
FIG. 1 is a block diagram of a system of multiple PCIe hierarchies as presently practiced where each hierarchy is independent of the others and generally incapable of efficiently accessing components of another hierarchy.

FIG. 1 is a block diagram showing a typical computing enterprise 100 having multiple storage controllers 102 and 122 each coupled to corresponding servers. It is a common configuration that the controllers may each be adapted to support a particular host attachment media and protocol. For example, one storage controller 102 may be adapted for Fibre Channel communication protocols with attached servers while a second storage controller 122 may be adapted for iSCSI or any other suitable protocol. Thus it is common for multiple connectivity protocols and media to be used by multiple storage controllers in an enterprise 100 for coupling storage systems and devices to the various servers.

As is generally known in the art, a typical storage controller 102 may include a host I/O interface device 104 for coupling to attached servers. Further, the typical storage controller 102 may include drive side I/O interface device 112 for coupling the storage controller 102 to an associated drive pool 114. Drive pool 114 may include, for example, disk drives or other suitable storage media for storing and retrieving data in response to requests from attached servers. A root device 108 within storage controller 102 may control overall operation of the storage controller and access information in the drive pool 114 utilizing a PCIe switch 106 to selectively access information through the host I/O device 104 and/or through the drive side I/O device 112. Memory 110 may be coupled to the root device 108 and may be used for storing relevant control data as well as for caching of user data associated with I/O requests generated by the attached servers. Exemplary storage controller 122 may be essentially identical to storage controller 102 and may include a host I/O interface device 124, PCIe switch 126, root device 128, memory 130, and drive side I/O interface device 132 for coupling to associated drive pool 134.

As noted above, as presently practiced in the art, storage controller 102 and 122 cannot easily share information. For example, as shown in FIG. 1, no connectivity may exist between storage controller 102 and storage controller 122. Rather, such an enterprise may rely upon attached servers to exchange relevant information that may then be shared with each of the storage controllers 102 and 122. In other known solutions (not shown) a separate communication channel may be used for exchanging information directly between the storage controller 102 and 122. For example, a separate Fibre Channel connection may be established between controller 102 and controller 122. Or, for example, a separate InfiniBand channel may be established between storage controller 102 and controller 122. Numerous other examples are well known to those of ordinary skill in the art including, for example, standard computer networking interface media and protocols.

As noted above, all such known connections between multiple storage controllers rely upon a separate communication channel distinct from the PCIe interconnecting structure within each storage controller. Thus exchange of information between storage controller 102 and storage controller 122 requires translation processing to convert PCIe transactions generated in controller 102 into corresponding network protocol or other protocol transactions and then back to a PCIe transaction to be performed on another controller 122. This translation process imposes significant overhead and complexity on the processing performed by each of the storage controllers 102 and 122.

Figure 2:
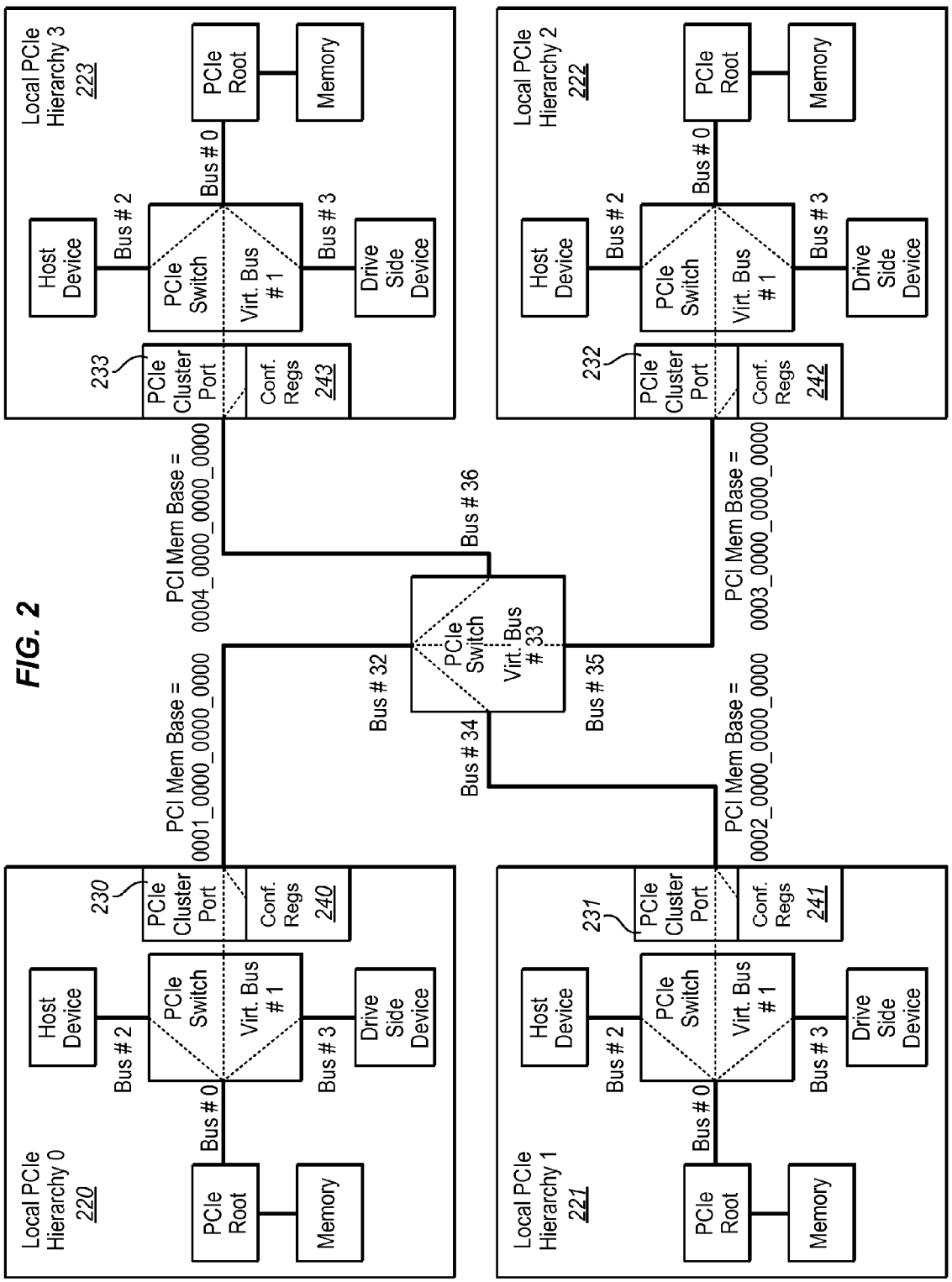
FIG. 2 is a block diagram of a system having multiple PCIe hierarchies where each hierarchy may access components of other hierarchies in accordance with features and aspects hereof.

By contrast, FIG. 2 shows an enhanced enterprise in accordance with features and aspects hereof in which each storage controller represents a local PCIe hierarchy and wherein each of the multiple PCIe hierarchies includes a cluster port to enable controlled exchange of information between components of various hierarchies without requiring translation from PCIe transactions into other network and communication protocols and media. Rather, in accordance with features and aspects hereof, the system or enterprise shown in FIG. 2 partitions the PCIe space such that each local PCIe hierarchy may access local components utilizing a first portion of the PCIe space and may access remote components within a different hierarchy directly utilizing PCIe transactions in a second portion of the PCIe space.

As used herein, "PCIe space" includes transactions having a memory address to access memory addressable components within a PCIe hierarchy and also includes configuration IDs contained within the transaction IDs of transactions frequently used in transactions when returning information in response to, for example, an earlier received read request transaction. Thus the partitioning of the PCIe space defines a first portion of the entire PCIe space to include a subset of memory addresses and Configuration ID values corresponding to components within the local hierarchy defined by each of the multiple PCIe hierarchies. A second portion of the partitioned PCIe space includes other memory addresses and configuration ID values corresponding to remote components addressed by a device from another higher hierarchy.

Thus, in accordance with features and aspects hereof, each hierarchy 220, 221, 222, and 223 includes a corresponding PCIe cluster port 230, 231, 232, and 233, respectively. Each cluster port allows its associated local hierarchy to controllably access remote components in other hierarchies of the storage enterprise. The plurality of hierarchies (220 through 223) are coupled through their respective cluster ports (230 through 233) through PCIe switch 250. The cluster port of each hierarchy serves to translate memory addresses and/or transaction IDs between the first portion of the PCIe space and the second portion of the PCIe space. In other words, the cluster port associated with each PCIe hierarchy detects when a particular memory address or transaction ID generated within its corresponding local hierarchy is referencing a local component or a remote component within another hierarchy. When the memory address or transaction ID references a component within the first portion of the PCIe space (i.e., a local component within the same hierarchy) then the cluster port need not intervene. However, when the cluster port detects that a component of its local hierarchy has generated a memory address or transaction ID associated with a remote component of another hierarchy in the second portion of the PCIe space, the cluster port receives that transaction, translates it appropriately, and forwards it through PCIe switch 250 to the appropriate other hierarchy.

Conversely, when a cluster port receives from the PCIe switch 250 a memory address or transaction ID referencing a local component within the cluster port's own corresponding local hierarchy, the cluster port is operable to translate the received address and/or transaction ID into corresponding appropriate values to reference a component within its local hierarchy. Thus, the translation processing performed by the cluster port associated with each local hierarchy allows each hierarchy to manipulate its own local components utilizing standard PCIe bus transactions and allows each local hierarchy to reference remote components in other hierarchies also using standard PCIe transactions. The cluster ports associated with each local hierarchy redirect transactions to an appropriate other hierarchy when a local transaction references an address or transaction ID value associated with the second portion of the PCIe space. Thus, by contrast with prior techniques, no translation between PCI transaction protocols and other networking protocols is required.

By comparison with evolving, yet to be standardized specifications in the PCISIG, standard PCIe switches may be utilized in the enterprise of FIG. 2 and standard PCI components may be utilized within each local hierarchy. The root devices and associated switches need not be multi-root aware ("MRA") as required by the evolving specifications for multi root virtualization from PCISIG.

From the perspective of the local PCIe hierarchy, its associated cluster port is logically transparent making the remaining remote cluster ports and resources made visible by remote cluster ports visible to the local hierarchies. In other words, by simply addressing resources made visible by the remote cluster ports in the second portion of the partitioned PCIe space, a local hierarchy may access remote components within another hierarchy of the enterprise.

From the perspective of the enterprise/cluster looking into the cluster port of a particular PCIe hierarchy, the cluster port appears as a standard PCIe endpoint device including a complete configuration register space. Thus, the cluster port, when appropriately configured in its register space, allows controlled, limited visibility of the various components and resources within its corresponding local PCIe hierarchy. Other controllers/hierarchies within the cluster/enterprise may thereby access the components within a local hierarchy made visible by its corresponding cluster port. In other words, the cluster port configuration provides "windows" into its corresponding local hierarchy for the resources that the cluster port wants to make visible to other hierarchies within the cluster/enterprise.

The "windows" defined by a cluster port are defined by a standard PCI construct called a base address register (BAR) in the configuration registers space of the cluster port. Each PCIe cluster port 230 through 233 therefore includes a configuration register space 240 through 243, respectively in which base address registers and other configuration related registers may be programmed to define the components within its corresponding local PCIe hierarchy that should be available or visible to other hierarchies in the cluster/enterprise. Such configuration register space utilization and utilization of base address registers in such a manner are well known to those of ordinary skill in the art.

In addition to translating (re-mapping) memory addresses exchanged between the various multiple hierarchies of the enterprise, features and aspects hereof include modification to the standard packet headers as a packet passes between a local PCIe hierarchy and another PCIe hierarchy of the enterprise. The function value as well as other values in the transaction ID and/or memory addresses in the packet header can be modified as the packet moves through a cluster port from its local hierarchy out to other hierarchies of the cluster or as it is received in a cluster port for forwarding into its associated local hierarchy. Examples of such translations are discussed further herein below with reference to other figures.

By way of example, the PCIe space may be partitioned such that only bits 0 through 48 of a 64 bit PCIe memory address may be used within a local hierarchy for referencing local components within that particular hierarchy. Thus each local hierarchy is limited to a 256 terabyte local address space for accessing local components within the hierarchy. For many applications including, for example, embedded applications such as a storage controller, this limitation is not a serious restriction. Thus a first portion of the PCIe space is defined as having the high-order 16 bits of a transaction's memory address being all zero such that the lower order 48 bits define access to local components of a local hierarchy—e.g., the first portion of the partitioned PCIe space. The high-order 16 bits of a memory address may be non-zero to reference a remote component within another hierarchy of the PCI the space—e.g., the second portion of the partitioned PCIe space.

In like manner, the PCIe space defined by transaction IDs in PCIe exchanges may also be re-mapped or translated in accordance with the partitioning of the PCIe configuration space. For example, the bus number, device number, function number and tag fields of a transaction ID may be limited in accordance with features and aspects hereof to free bits for saving the bus number of the initiating device in the local hierarchy. The bus number of the initiating hierarchy as viewed from the other hierarchies and the switched fabric may be inserted within the transaction ID bus number field to identify the hierarchy when any related transaction is returned for forwarding through the PCIe switch back to the initiating hierarchy. By way of example, the bus number field of a transaction ID specified as 8 bits wide may be limited to only 5 bits such that the local hierarchy may only access local bus segments numbered 0 through 31 within its local hierarchy. In like manner the device number specified as a 5 bit field of the transaction ID may be limited to 3 bits such that local device numbers may only range between 0 and 7 on any local bus segment numbered 0 through 31 of the local hierarchy. Further, in like manner, the tag field of the transaction ID normally specified as 8 bits wide may be limited to 5 bits such that the tag number is limited to values between 0 and 31 for exchanges within the local hierarchy. The unused bits freed for use by limiting the fields of the transaction ID may then be utilized for saving the local hierarchy bus number value of the transaction ID. Specifically, the low order 5 bits of the bus number field that indicate the bus number in the local hierarchy of the device that initiated the transaction may be saved in the freed, reserved bits. The bus number of the hierarchy can then be inserted in the 8 bits of the bus number field so as to identify the particular initiating hierarchy to be accessed when a related return transaction uses the transaction ID field to return information through the cluster ports of multiple hierarchies.

Thus, the PCIe space is also partitioned with respect to transaction IDs such that a first portion of the PCIe space defines access to local bus numbers and device numbers ranging between 0 and 31 and 0 and 7, respectively. Further, only a limited range of transaction IDs between 0 and 31 may be utilized within this first portion of the PCIe space. Any other values generated in the bus field, may be used to specify that another hierarchy is to be accessed utilizing the transaction ID—e.g., a second portion of the PCIe space.

The configuration registers 240 through 243 of each cluster port 230 through 233, respectively, may also define the bus number associated with each cluster port from the view of other hierarchies in the cluster/enterprise. This bus number is also referred to herein as a "cluster number" of a "hierarchy number". In other words, bus numbers above 31 (e.g., 32 through 255) may be assigned to each cluster port from the perspective of the PCIe switch 250. Thus, PCIe switch 250 may route memory addresses in PCIe transactions and transaction IDs in PCIe transactions to an appropriate cluster port of a particular hierarchy. No special logic is required in the PCIe switch 250 to achieve this purpose since all translation of the memory addresses and transaction IDs in PCIe exchanges is performed within the cluster port logic of each local hierarchy 220 through 223.

Exemplary base memory addresses and bus/cluster/hierarchy numbers are shown assigned to the various PCIe cluster ports 230 through 233 of FIG. 2. For example, the base memory address for cluster port 230 of hierarchy 220 may be (hexadecimal) 0001_0000_0000_0000 and its bus number for switching of exchanges having transaction IDs may be assigned as bus 32. In like manner, PCIe cluster port 231 of hierarchy to 21 may have a base memory address of 0002_0000_0000_0000 and a bus number of 34, cluster port 232 of the hierarchy 222 may have a base memory address of 0003_0000_0000_0000 and a bus number of 35, and lastly, cluster port 233 of hierarchy 223 may have a base memory address of 0004_0000_0000_0000 and a bus number of 36 assigned thereto. Since a PCIe switch generally integrates a bridge device, the switch 250 itself is also assigned a bus number (shown as a "virtual bus number" 33).

Further, as shown in FIG. 2, local bus numbers for bus segments within a local hierarchy are assigned values below 32 in this exemplary partitioning of the PCIe space. For example, bus numbers 0, 1, 2, and 3 are shown as utilized within each local hierarchy 220 through 223. In like manner, the address space within the 16 terabyte limit of local access within each local hierarchy may be partitioned in any suitable manner appropriate for the particular application. In other words, cache memory and other components within a local hierarchy may each be assigned their own respective address ranges within the 16 terabyte partition space (the first portion of the PCIe space).

Those of ordinary skill in the art will readily recognize that numerous other components may be included within a fully functional enterprise and a fully functional local hierarchy (e.g., storage controller). For example, in the context of a storage controller as a local hierarchy, such additional elements may include parity assist circuits for RAID storage management purposes, DMA controller components for control of direct memory access transactions, etc. Further, any number of such local hierarchies may be defined limited only by the desired partitioning of the PCIe space.

Figure 3:
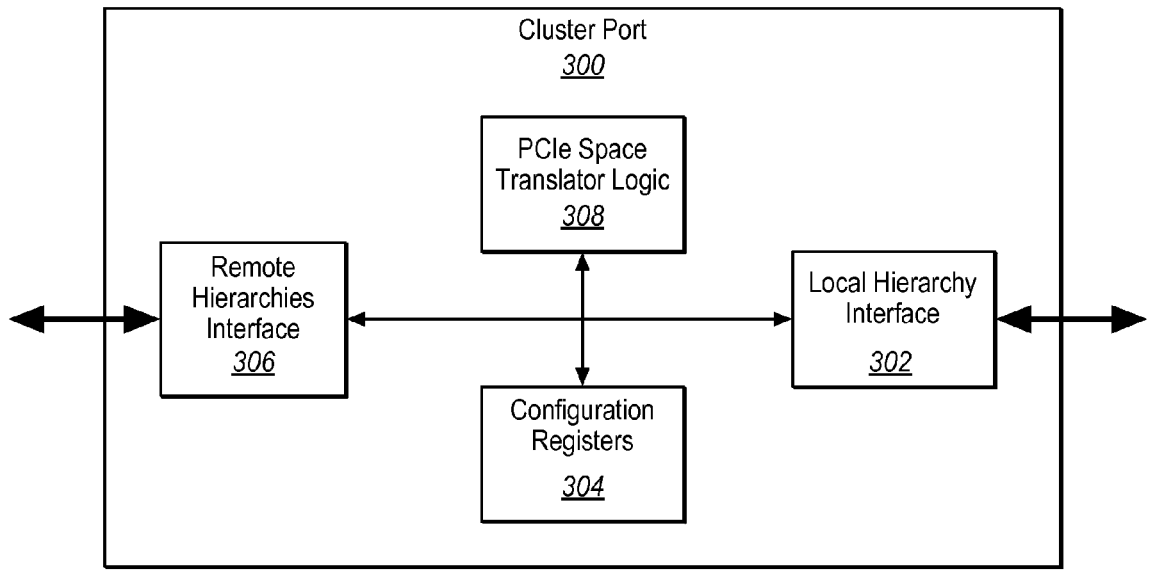
FIGS. 3 and 4 provide exemplary additional details of a cluster port as associated with each hierarchy in accordance with features and aspects hereof to provide mapping and translation of transactions exchanged between a first and second hierarchy of the cluster.

The FIG. 3 is a block diagram providing additional details of an exemplary embodiment of a typical cluster port 300. Cluster port 300 therefore exemplifies the cluster ports 230 through 233 of FIG. 2. Cluster port 300 may include configuration registers 304 as noted above in which the base address registers (BAR) and various other configuration parameters may be programmed as is well known for those of ordinary skill in the art. The base address registers (BAR) and other configuration parameters define which local components of the associated local hierarchy are to be visible to other hierarchies of the enterprise. Local hierarchy interface element 302 couples the cluster port 300 to the PCIe local hierarchy containing the cluster port. In like manner, remote hierarchies interface element 306 couples the cluster port 300 through a standard PCIe switch to any of the other hierarchies in the enterprise. PCIe space translator logic 308 is operable to translate memory addresses and transaction IDs exchanged between the local hierarchy and any of the other hierarchies of the enterprise. The translation process is substantially as noted above and exemplary translations are discussed further herein below with respect to later figures.

Figure 4:
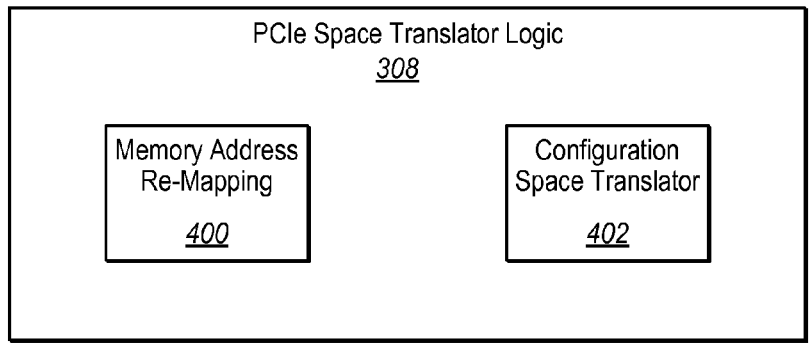

FIG. 4 is a block diagram providing exemplary additional details of the structure of the PCIe space translator element 308 of FIG. 3. Functional elements within the translator logic 308 may include a memory address re-mapping element 400 for mapping/translating memory addresses used in PCIe transactions exchanged between PCIe hierarchies. As noted above, the PCIe space is logically partitioned by the cluster port logic such that a first portion of the space corresponds to the upper address bits coded as zeros and only lower order address bits in memory addresses used in PCIe exchanges. This first portion is used within a hierarchy to reference local components within that hierarchy—in other words memory addresses in the first portion of the PCIe space are not translated by the cluster port (i.e., by the translator logic) but rather are used solely within the particular local hierarchy. A second portion of the PCIe space corresponds to the remaining memory addresses specifying non-zero values in the higher order address bits. Such a memory address is used by a first hierarchy to reference remote components in a second, remote hierarchy.

The translator logic 308 of the cluster port of the first hierarchy receives the address referencing a remote component and forwards the received memory address transaction through a standard PCIe switch to the remote/second hierarchy. The switch routes the transaction in accord with the higher order bits of the memory address that serve to identify a particular cluster port or hierarchy of the system. The cluster port of the second/remote hierarchy will receive the address from the first hierarchy and translate/re-map the received address into an appropriate memory address for a corresponding local component within its corresponding hierarchy. In general this translation will simply involve masking off the higher order bits used to route the transaction between the two hierarchies. Only the lower order bits are needed to forward the received, translated transaction into the receiving second hierarchy (the hierarchy containing the receiving cluster port). The transaction may then be processed through local access within the second or receiving hierarchy.

Thus the memory address re-mapping element 400 re-maps or translates memory addresses exchanged between a first/local hierarchy and a second/remote hierarchy of the system. The re-mapping element in the cluster port of the first hierarchy and of the second hierarchy may each perform requisite translation of the memory addresses exchanged to enable the first hierarchy to reference remote components of another hierarchy in the system.

Translator logic 308 may further include a configuration space translator element operable to re-map/translate transaction IDs exchanged between a first/local hierarchy and a second/remote hierarchy. As is well known to those of ordinary skill in the art, a PCIe transaction may identify a device using bit fields in a transaction ID value. Typically this field identifies the device that originated a transaction such as a read request so that the requested information may later be directed back to the originator of the request. In general, a transaction ID identifies a device by identifying a bus segment number to which the device is coupled and a device number on that identified bus segment. Further, a tag field may further identify the particular transaction associated with that device on that bus segment. These bit fields of the transaction ID are well known to those of ordinary skill in the art.

As noted, the cluster port features and aspects hereof implement a partitioning of the PCIe space including a partitioning of the transaction ID values so that transaction IDs may be generated by a first hierarchy to reference a component in a second hierarchy. For example, the number of bits in the transaction ID used for defining various fields (such as the bus ID and the device ID) may be reduced to reserve bits used to identify a cluster or hierarchy to identify the cluster to which information may be later returned in completing an associated transaction. Thus the configuration space translator element 402 in translator logic 308 of cluster port 300 is operable to translate or re-map transaction ID values exchanged between a first or local hierarchy and a second or remote hierarchy. For example, bus number values may be limited to 5 bits out of the standard 8 bit field when referencing bus segments within that local hierarchy. The higher order 3 bits of the bus number field of a transaction ID may then be redefined in accordance with features and aspects hereof to encode all or part of a cluster or hierarchy number. In like manner, the lower 3 bits of the 5 standard device number bits of a transaction ID may be used for referring to devices within the local hierarchy. The higher order 2 bits of the device number field may then be used for encoding all or part of the cluster or hierarchy number. In like manner, a portion of the tag ID field and/or the function number field may be reserved such that only a limited range of tag values and/or function values may be used in the local hierarchy and the remaining higher order bits may be used for encoding all or part of the cluster or hierarchy number. The particular number of bits to be re-mapped for use in encoding a cluster number or bus number may be selected as a matter of design choice for a particular application. Some application may require a larger local PCIe space while other applications may require a larger PCIe space for mapping of remote devices and busses.

The bits of the transaction ID that are re-defined may then be used by the cluster port of the hierarchy originating the underlying initial transaction to save the bus number to which a return transaction is to be directed within the local hierarchy (e.g., the bus number of the device in the local hierarchy that originate a read request to obtain data from a remote device in another hierarchy). With such a cluster or hierarchy number saved and encoded in the reserved, re-defined bits of the transaction ID, the bus number or cluster number of the cluster port of the local hierarchy within the multiple hierarchies may then be inserted in the bus number field bits of the transaction ID. The bus number or cluster number so inserted may then be used if/when another transaction is directed back to the first hierarchy (e.g., when a remote device is ready to return requested data to the original requesting device in the first hierarchy). The inserted bus number is used to route the return transaction back to the cluster port of the first hierarchy that originated the underlying transaction. The cluster port is then operable to forward the associated underlying bus transaction to the appropriate other hierarchy based on the remote memory address of the underlying original transaction. The remote hierarchy saves the transaction ID value for later return to the originating cluster (i.e., when the requested data is ready for return to the originating cluster). When the cluster port of the hierarchy that initiated the original, underlying transaction receives the re-mapped/translated transaction ID back from the remote cluster, the bus number used to identify the originating cluster in the multiple hierarchies is replaced with the reserved bits containing the saved bus number of the originating device within the local hierarchy. The bits used to save the original bus number are them removed (e.g., restored to zero values). The bus transaction with the transaction ID so translated is then applied to the local hierarchy containing the cluster port that received the transaction returning requested information.

For example, in a read transaction, the transaction ID may be processed as follows. The cluster port of the hierarchy originating the read transaction saves the local requester ID bus number in the reserved bits of the transaction ID and replaces the transaction ID bus number with the cluster port bus number (the bus it is connected to). This cluster port bus number is used to route the read completion from the second hierarchy back to the cluster port of first hierarchy where the local requester ID bus number (saved in the reserved bits) is restored to bus number in the transaction ID. The read completion transaction is then routed by this bus number in the first hierarchy. The second hierarchy cluster port never translates the transaction ID. Memory request are routed with the memory addresses, but the transaction ID of the request is changed as the packet passes through the first hierarchy's cluster port. Read completions are routed by the transaction ID.

Those of ordinary skill in the art will readily recognize numerous additional and/or equivalent elements within a fully functional cluster port 300 and/or translator logic 308. FIGS. 3 and 4 are therefore intended merely as exemplary of one possible functional decomposition of typical functional elements in a cluster port embodiment. Further, those of ordinary skill in the art will readily recognize numerous combinatorial logic circuit designs to implement the re-mapping and translation functions of the cluster port 300 and the translator logic 308.

Figure 5:
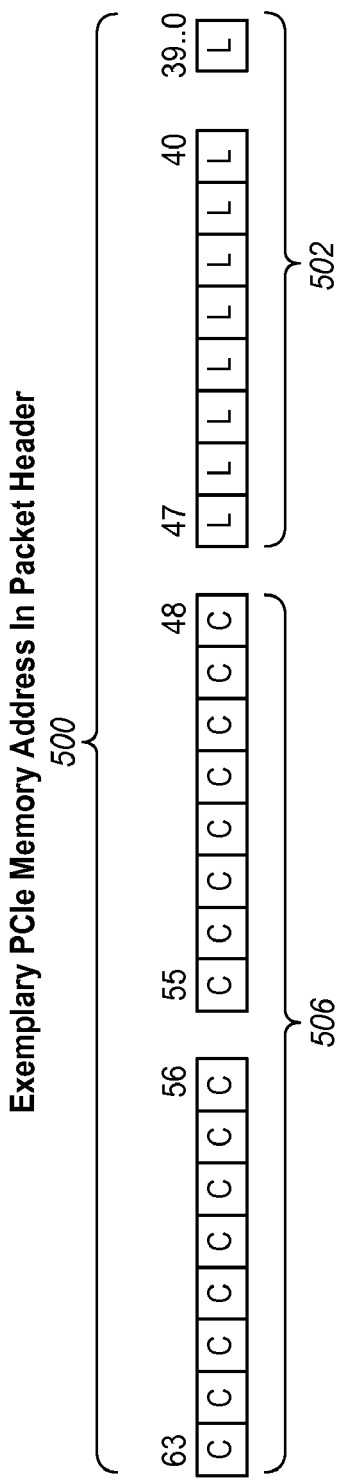
FIGS. 5 and 6 are block diagrams describing different mappings of memory addresses and transaction IDs to permit routing between multiple hierarchies in accordance with features and aspects hereof.
Figure 6:
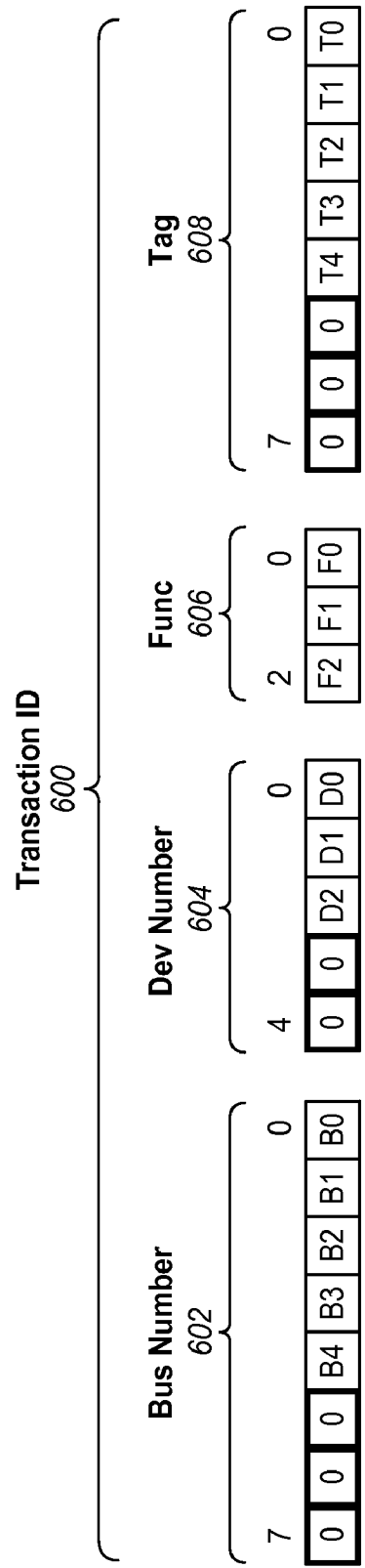

FIGS. 5 and 6 are diagrams describing exemplary re-definitions of bits in memory addresses and transaction IDs, respectively, as may be exchanged among the plurality of hierarchies in accordance with features and aspects hereof. As shown in FIG. 5 a memory address 500 in a PCIe packet header may be re-mapped such that a low order portion 502 of the address (e.g., a first portion of the PCIe space) may be used to reference local components of the local/first hierarchy that contains the cluster port. For example, the low order 48 bits of a 64 bit PCIe memory address may be used to access local components of the local hierarchy. All higher order bits (48 through 63) are encoded as zeros to access a local component within the local hierarchy. In accordance with configuration programming of the cluster port, the cluster port will not respond to such a memory address having all zeros in the higher order bits (48 through 63).

Conversely, where the higher order bits (48 through 63) are non-zero, the cluster port configuration registers (e.g., BAR) permit the cluster port to respond to the memory address in the transaction. In particular, bits 48 through 63 of the 64 bit PCIe memory address may encode a cluster or hierarchy address 506 identifying the remote hierarchy in which a remote component is to be accessed. The cluster port of the local hierarchy may then forward the memory address to the PCIe switch coupling the cluster port of the local hierarchy to the other hierarchies of the cluster.

More specifically, in the exemplary partitioning of the memory address space of the PCIe space, in the local PCIe memory space (i.e., the first portion of the space), all memory must be mapped in the lower 256 terabytes of memory space (e.g., address bits 63 through 48 are zeros).

Preferably when a packet routed by memory address (memory read or write) is generated in a local PCIe hierarchy with any of these higher order bits (48 through 63) ON, the packet will be directed to its cluster port and the cluster hierarchy. The local PCIe bus may be configured to direct packets with memory address values greater than or equal to 256 terabytes to its cluster port and thence through the cluster hierarchy switch/switches to another/remote hierarchy. Thus memory address bits 47 through 0 are used for routing memory packet within the local PCIe hierarchies and bits 63 through 48 of the memory address are used as the routing bits in the cluster hierarchy. This particular exemplary mapping suggests that all local hierarchy memory windows defined in the cluster hierarchy (mentioned above) be aligned to different 256 terabyte boundaries. These windows don't have to be 256 terabytes in size, but should start on 256 terabyte alignments. In other words, the cluster PCIe hierarchy should be initialized so that address routed packets are routed based only on address bits 63 through 48 of the applied memory address. This initialization includes initializing all PCIe switches in the cluster so that they forward packets based on 256 terabyte granularity (upstream, downstream, or peer-to-peer). Additional details exemplary of such initialization are presented herein below.

In addition to partitioning of the memory address space exemplified by the memory address of FIG. 5 and in accordance with features and aspects hereof the cluster port also effectuates a partitioning of the PCIe space with respect to transaction ID values (e.g., partitioning the configuration space). As is well known to those of ordinary skill in the art, completion of a read request (initiated, for example, as a memory address based PCIe transaction) is often completed at a later time with return of requested data in a separate PCIe transaction. This return data PCIe transaction includes a transaction ID (600) that, in general, identifies the bus segment (602) and device ID (604) on that bus segment for the device to which the returned information is to be applied as a transaction. A tag field (608) and a function value (606) may further identify the particular transaction for which information is being returned.

The cluster port in accordance with features and aspects hereof effectuates a partitioning of this configuration space of the PCIe space by reserving bits of some of the transaction ID 600 fields for use in translating bus numbers. A first portion of the bus numbers in the configuration space may be reserved for local access to local bus numbers within a local hierarchy. A second portion of the bus numbers in the PCIe configuration space are then used to identify each hierarchy by a corresponding bus number to allow routing of such transactions through the fabric based on assigned bus numbers. For example, the number of bits used in a local hierarchy to reference a bus number (602) may be limited to 5 of the standard 8 bits. These 5 bits identify the local bus number in the originating hierarchy of the device to which a returned transaction is to be directed. These 5 bits (specifying a local bus number between 0 and 31) are saved by operation of the cluster port of that hierarchy when the initial transaction is directed out from the local hierarchy, through the cluster port and into the fabric to another hierarchy. In place of the saved local bus number, a bus number in the second portion of the configuration space (bus numbers ranging from 32 to 255) is inserted to identify the cluster port of this local hierarchy when a return transaction is sent from another remote hierarchy back to the initiating device in the first hierarchy. When such a return transaction reaches the cluster port of the first hierarchy the initiated the underlying transaction, the saved bus number in the transaction ID may be restored to its normal bit positions in the bus number field of the transaction ID and the transaction is then processed normally in the local hierarchy.

In order to save the initial local bus number in the transaction ID, the number of bits used in a local hierarchy to reference a device number (604) may be limited to 3 of the standard 5 bits and a limited number of the standard bits defined in the tag field (608) may be used within the local hierarchy to further identify particular transactions. For example, the low order 5 bits of the tag field 608 may be used for transaction IDs within a local hierarchy. Or, for example, a limited number of bits of the function field may be used and remaining bits freed for encoding cluster information.

The additional bits not used for local hierarchy exchanges should be all zero in local hierarchy transactions thus defining a first portion of the configuration space of the PCIe space. In transactions exchanged between a first and a second hierarchy through the PCIe switch/switches and cluster ports of the first and second hierarchies, the reserved bits are used to save the bus number of the originating device within the first hierarchy when a related transaction is returned from the second hierarchy to the first. Those of ordinary skill in the art will readily recognize numerous apportioning and repositioning of bits in of the transaction ID such that the bus number of the originating device may be encoded (i.e., saved) within the additional reserved bits. In like manner, other mappings of the transaction ID 600 bits are feasible that permit saving and restoring of the bus number of the originating device will be readily apparent to those of ordinary skill in the art. Thus, the exemplary re-mapping or translation presented in FIG. 6 is intended merely as one possible such mapping to permit bits of the transaction ID 600 to be re-mapped or translated as a transaction ID is exchanged between a first hierarchy and a second hierarchy of a system.

Figure 7:
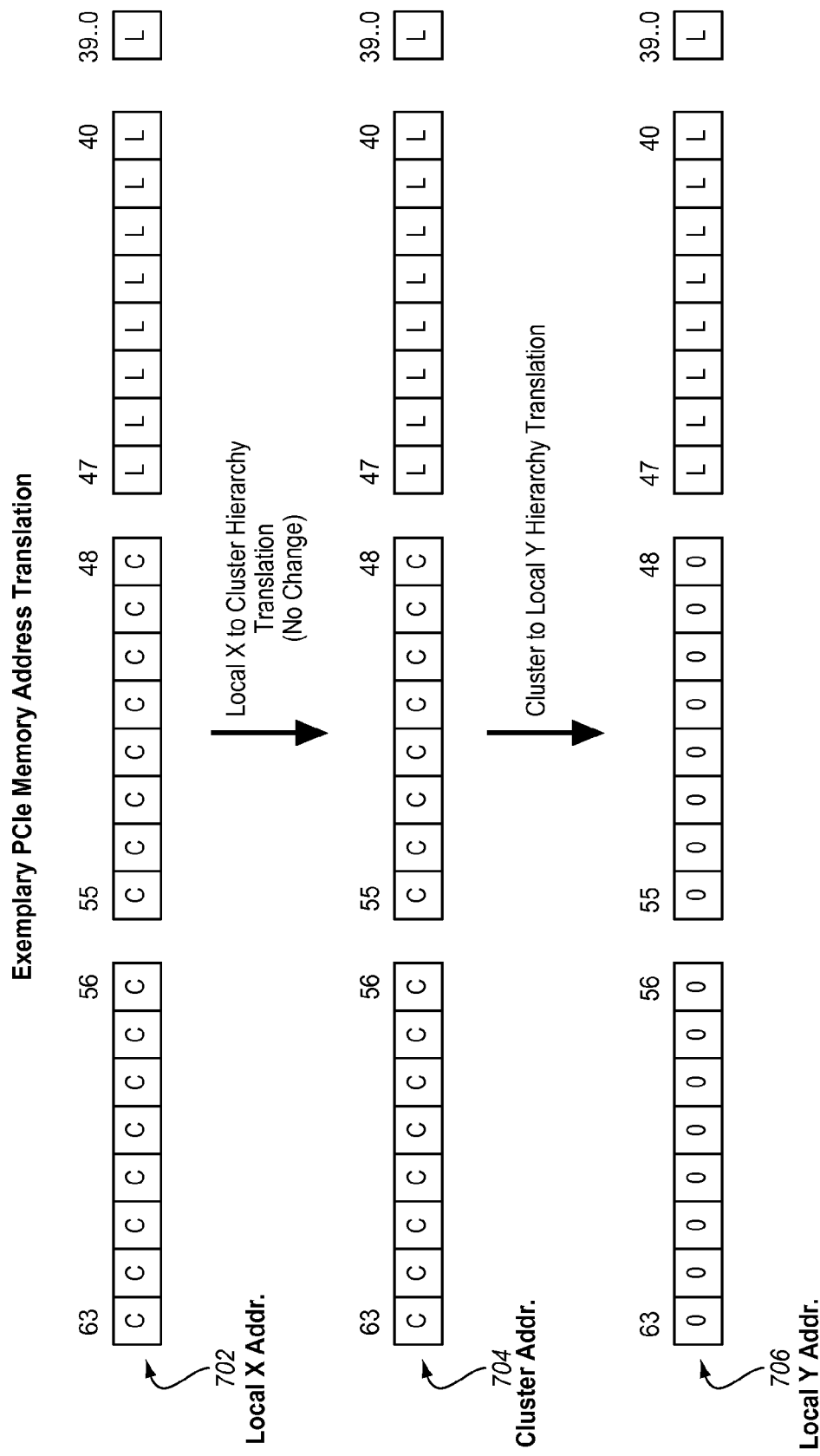
FIGS. 7 and 8 are diagrams that describe the process of mapping or translating memory addresses and transaction IDs as they may be exchanged between a first and second hierarchy of a cluster in accordance with features and aspects hereof.

FIG. 7 depicts an exemplary translation or re-mapping of an exemplary PCIe memory address as it is forwarded from a first hierarchy, through the cluster port of that first hierarchy, to a second hierarchy in the system comprising multiple PCIe hierarchies. The translation process 700 depicted in FIG. 7 begins with a memory address 702 generated within a first hierarchy indicating that it is referencing a component in another hierarchy of the system. As noted above, such an indication may be encoded as a non-zero value in any of the higher order bits of the memory address 702 that are not used for addressing local components within the first hierarchy (e.g., an address in the second portion of the PCIe space). As discussed herein, one exemplary mapping of the address 702 provides that the lower order 48 bits (0 through 47) are used for addressing components within the local or first hierarchy when all other high-order bits (48 through 63) are zero. Thus, memory address 702 represents an attempt by the first hierarchy to address a remote component in another hierarchy. The particular other hierarchy to be addressed is identified by higher order address bits in memory address 702. For example, bits 48 through 63 may identify the particular cluster in which a component further identified by address bits 0 through 47 is to be accessed.

Memory address 702 is received by the cluster port within the first hierarchy. The configuration registers of the cluster port of this first hierarchy are programmed, as is well known by those of ordinary skill in the art, such that the cluster port will respond to any memory address having a non-zero value in the higher order address bits such as bits 48 through 63 of memory address 702. The cluster port of the first hierarchy receives the transaction with memory address 702 and forwards the memory address 702 (essentially without change) as memory address 704 into the switched fabric connection of the clustered hierarchies. The fabric comprising PCIe switches receives the memory address 704 and forwards the associated transaction to the cluster port of the identified cluster or hierarchy indicated in, for example, bits 48 through 63 of memory address 704. As noted above and as readily apparent to those of ordinary skill in the art, the fabric of one or more PCIe switches coupling the various hierarchies of the system are programmed to switch a transaction based on the value in the higher order bits of memory address 704 that identify each particular cluster or hierarchy. Again as noted above, in the exemplary embodiment of FIG. 7, bits 48 through 63 serve the purpose of identifying the particular cluster or hierarchy to which the transaction is directed.

The transaction so redirected by the switched fabric coupling the multiple PCIe hierarchies is received by the cluster port of the intended destination hierarchy—the second hierarchy to which the first hierarchy intended to direct the initial transaction. The cluster port of the second hierarchy removes the high-order bits retaining only the lower order bits to generate the translated local address 706 within the second hierarchy. In other words, high-order bits (e.g., bits of 48 through 63 as exemplified in address 706) are zeroed so that the lower order address bits (e.g., bits 0 through 47) are used to address the desired component within the second hierarchy. Thus, the address 702 generated within the first hierarchy is applied through the cluster ports of the first and second hierarchies and the intermediate switched fabric and is translated by the cluster port of the second hierarchy into address 706. The first hierarchy may thereby reference remote components within another hierarchy as though they are addressed locally within its own hierarchy. Such memory addressed PCIe transactions are thereby exchanged between a first and second hierarchy by translating the memory address generated within the first hierarchy and forwarding the translated memory address PCIe transaction to another remote component in another PCIe hierarchy of the system.

Those of ordinary skill in the art will readily recognize numerous equivalent mapping of bits of a memory address in the PCIe transaction to permit translation of an address generated in a first hierarchy to a corresponding address of a remote component in another PCIe hierarchy. Thus, the exemplary translation of FIG. 7 is intended merely as one possible embodiment of such a translation process and of the definition of bits reserved in the PCIe memory address space for such exchanges between hierarchies.

Figure 8:
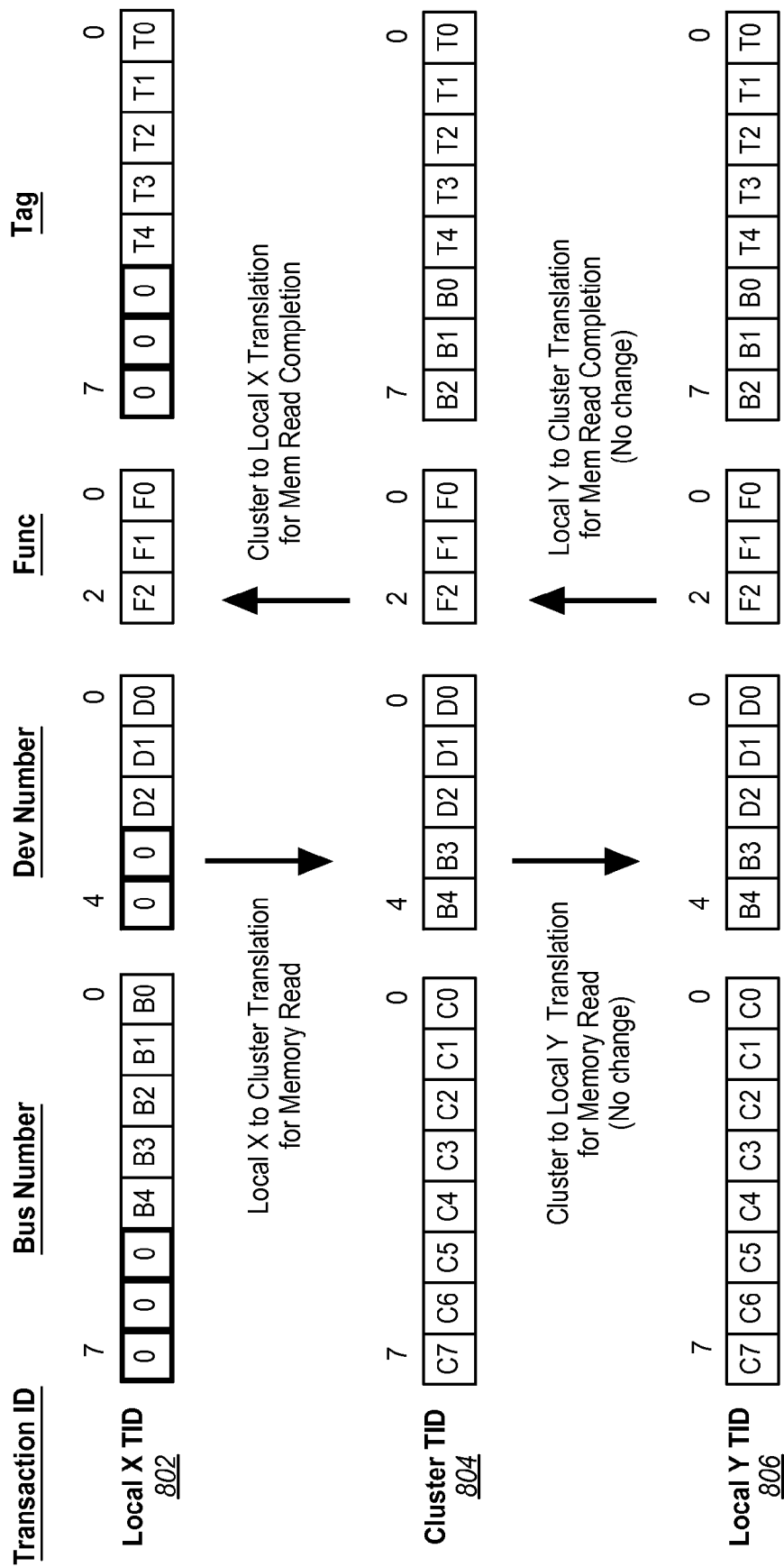

Similar to FIG. 7, FIG. 8 describes exemplary translation of a transaction ID as utilized in a PCIe transaction. As generally known to those of ordinary skill in the art, a transaction ID is used to complete a previous read request where the device initially addressed by the request later completes the requested transaction and returns information to the original requestor. The transaction ID field, as it is generally known in the art, includes a number of defined fields as discussed above for identifying the particular bus segment, device on that segment, function, and tag with which the returned information is to be associated. In general the transaction ID is generated as a part of the original transaction by the requesting (first) hierarchy. When the addressed device completes the request and returns requested information, the transaction ID is returned with the transaction returning the data and is used within the cluster fabric to route the transaction to the originating device in the first hierarchy.

As discussed above, fields of the transaction ID may be shortened for local hierarchy transactions in accordance with features and aspects hereof. The shortened fields require fewer bits for encoding as compared to the number of bits required for the full specification of the field in the transaction ID. The unused bits may then be utilized for retaining cluster related information as the transaction ID is exchanged between a first PCIe hierarchy and another PCIe hierarchy. FIG. 8 is exemplary of a translation process 800 in which a transaction ID 802 is generated in a first hierarchy associated with a corresponding transaction. The transaction ID 802 is a then translated by the cluster port of the first hierarchy to redefine (re-map or translate) various bits of the fields of the transaction ID to generate a translated transaction ID 804. That translated transaction ID 804 saves the bus number of the initiating device in the first hierarchy as the original source of the transaction ID. As noted above, unused bits in the various fields may be redefined and the fields themselves may be re-mapped so as to save the original, local bus number. In place of the saved bus number, a bus number field is inserted that identifies this local hierarchy as the initiator of the underlying transaction. As discussed above and as shown in FIG. 2 each cluster port of each hierarchy is associated with a PCIe memory address and with a PCIe bus number—in the second portion of the partitioned PCIe space. Thus the bus number inserted in the translated transaction ID 804 (C0..C7) is the bus number (i.e., cluster number) of the local hierarchy as viewed from other hierarchies attached to the switched fabric.

The remote device in a second hierarchy that will receive the transaction ID need not decode the information directly but rather stores the transaction ID for return in a corresponding return transaction for requested information. Thus the translated transaction ID 804 may be forwarded through the cluster to the remote hierarchy. When the remote hierarchy device is prepared to send back a return transaction, the translated transaction ID 804 is routed through the hierarchy in accordance with the cluster number encoded into the translated transaction ID 804 (C0..C7).

As shown in FIG. 8, the cluster number or bus number may be encoded into the 8 bits normally used for the bus number. The original local bus number (B0..B4) is saved in reserved bits of the device number field (bits 3 and 4) and in reserved bits of the tag number field (bits 5, 6, and 7). The cluster number encoded into the translated transaction ID 804 (C0..C7) is the cluster number or hierarchy number of the first hierarchy used to generate the original transaction ID 802 as that hierarchy is known to other hierarchies attached to the switched fabric. The cluster number or hierarchy number so identifying the first hierarchy corresponds to the bus number to which the first hierarchy's cluster port connects into the PCIe fabric and which is contained within the cluster port's configuration registers. The cluster number or hierarchy number so encoded may then be used by the switched fabric coupling the multiple hierarchies to identify a bus number in the clustered hierarchy so that the returned information associated with the transaction may be first routed back through the hierarchy to the first hierarchy that generated the transaction ID.

The translated transaction ID is then forwarded through the switched fabric to an identified destination hierarchy or cluster identified in the underlying transaction that includes the provided transaction ID. Thus the receiving cluster port receives the transaction including the translated transaction ID 806 and retains the translated transaction ID for possible return of information associated with the underlying transactional request. For example, as well known to those of ordinary skill and the art, a first hierarchy may generate a transaction including an original transaction ID 802 and addressed to a remote component utilizing a memory address as described above with respect to FIG. 7. Such a transaction may request return of some information (e.g., previously stored user data, management status related information, etc.). As is generally known in PCIe architectures, the remote component of the other hierarchy may require some processing time to complete the requested transaction and return the requested information. Thus the transaction ID associated with the received transaction is used to affiliate the returned information with the original transaction that requested the return of information. When the remote component in the second hierarchy completes the provided underlying transaction, the requested information will be returned to the first hierarchy using the translated transaction ID 806 stored retained by the second hierarchy. Thus as above, the cluster number encoded into the translated transaction ID 806 is used by the PCIe switch or switches to direct the returned information back to the originating cluster or hierarchy number (i.e., the cluster identified in the encoding of the transaction ID). When properly directed to the originating cluster number, the cluster port of that originating first hierarchy receives the encoded, translated transaction ID 804 and translates or re-maps the various bit fields to restore the original transaction ID values as indicated in transaction ID 802. In particular, the cluster number (C0..C7 of the translated transaction ID 804) is no longer required in the transaction ID and the saved bus number (B0..B4) may be restored to its normal, standardized bit positions and values. In particular, as exemplified in FIG. 8, the original bus number of the initiating device within the local hierarchy may be restored from the saved copy in the reserved bits and restored to the bus number field of the transaction ID for use within the initiating local hierarchy.

Those of ordinary skill and the art will readily recognize numerous equivalent mapping steps to translate a memory address or transaction ID for exchange through the PCIe switched fabric between a first hierarchy and the second hierarchy in accordance with features and aspects hereof. Thus, FIGS. 7 and 8 are intended merely as one exemplary embodiment of such mapping and translation processing among the plurality of hierarchies.

Figure 9:
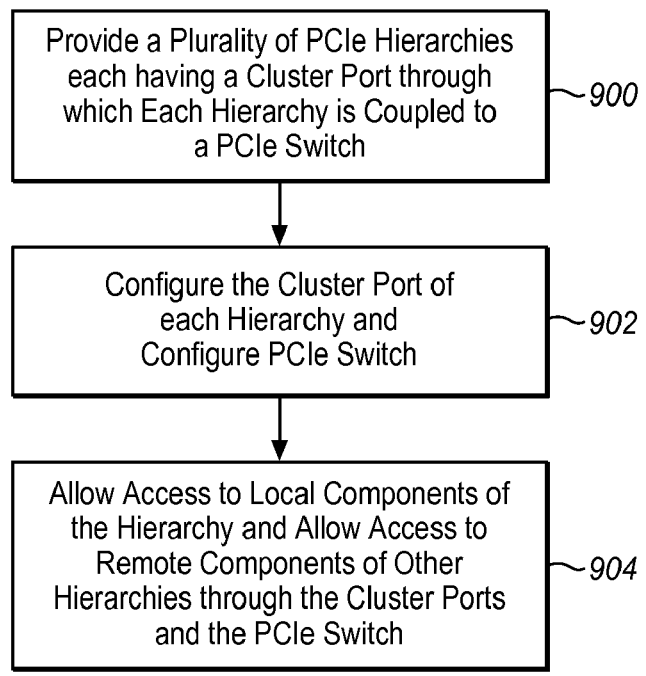
FIGS. 9, 10 and 11 are flowcharts describing methods for exchanging transactions between a first and second hierarchy in a cluster of PCIe hierarchies in accordance with features and aspects hereof.

FIG. 9 is a flowchart broadly describing a method in accordance with features and aspects hereof to permit access between hierarchies of a multiple PCIe hierarchy system. Element 900 represents processing to initially provide such a configuration of a clustered, interconnected plurality of PCIe hierarchies wherein each hierarchy includes a cluster port coupling the hierarchy through a PCIe switched fabric to each of the other hierarchies of the system. Utilizing such a configuration, element 902 is then operable to configure the cluster port of each hierarchy and also to configure the PCIe switched fabric. The cluster port of each hierarchy is generally configured by programming values into its set of configuration registers (e.g., BAR registers and other configuration registers) so that the cluster port for each hierarchy responds to memory addresses and transaction IDs exchanged among the hierarchies through the PCIe switched fabric. The PCIe switched fabric is generally configured by configuring switches that comprise the fabric such that each hierarchy is associated with a PCIe bus number (e.g., bus segment number) and memory address. As noted above, in one exemplary mapping of bus numbers in transaction IDs, bus numbers 0 through 31 may be reserved for internal access within each local hierarchy whereas bus numbers greater than 31 (e.g., 32 through 255) may be assigned by the PCIe switches to associate a bus number with each hierarchy represented by the cluster port of that hierarchy. In like manner, the PCIe switches are configured to switch memory addressed transactions among the various hierarchies based solely on higher order address bits as discussed above. For example, in one mapping, each hierarchy may be associated with a particular 256 terabyte aligned segment of the PCIe space. Thus the PCIe switches of the fabric may switch the memory addressed transactions based on the high order 16 bits of the addresses (63 through 48). Details of exemplary initialization are discussed further herein below.

Element 904 then represents ongoing operation of the system to enable access between the multiple hierarchies. More specifically, element 904 represents ongoing operation of the system wherein each hierarchy may perform transactions within its own local hierarchy using standard PCIe transactions all associated with the first portion of the total PCIe space. In addition, element 904 represents ongoing operation of the system wherein each hierarchy may perform PCIe transactions addressed to a remote component in another hierarchy of the system. The cluster ports associated with each hierarchy perform all requisite translation and re-mapping of memory addresses and transaction IDs associated with the transactions between a first and second hierarchy.

Figure 10:
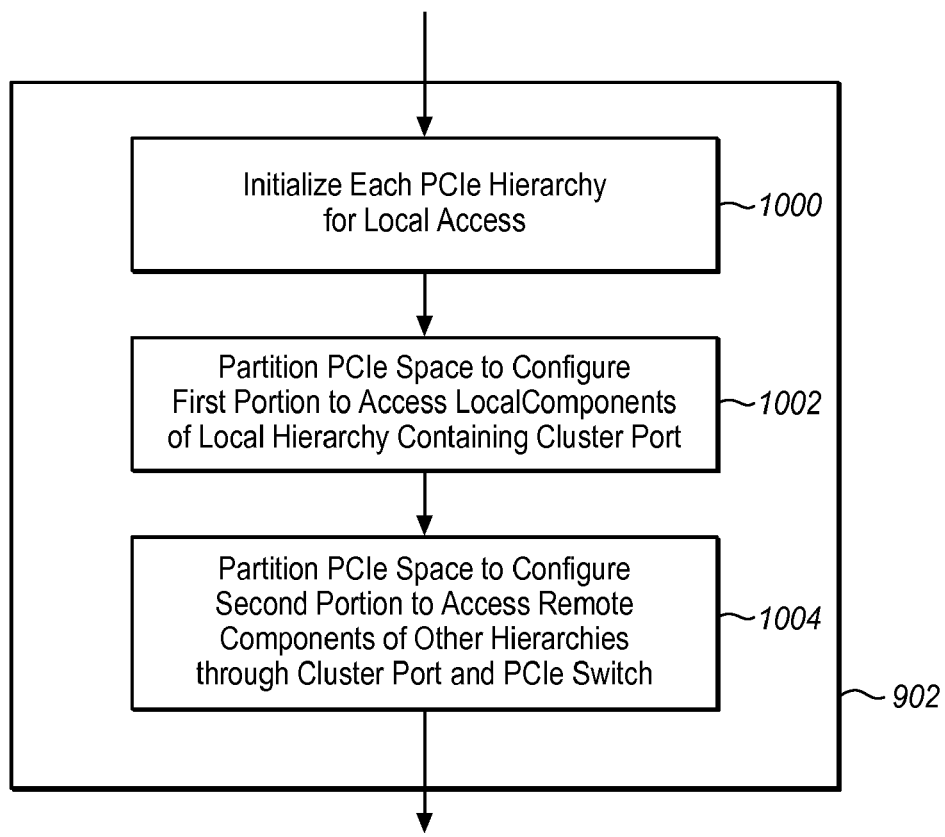
Figure 11:
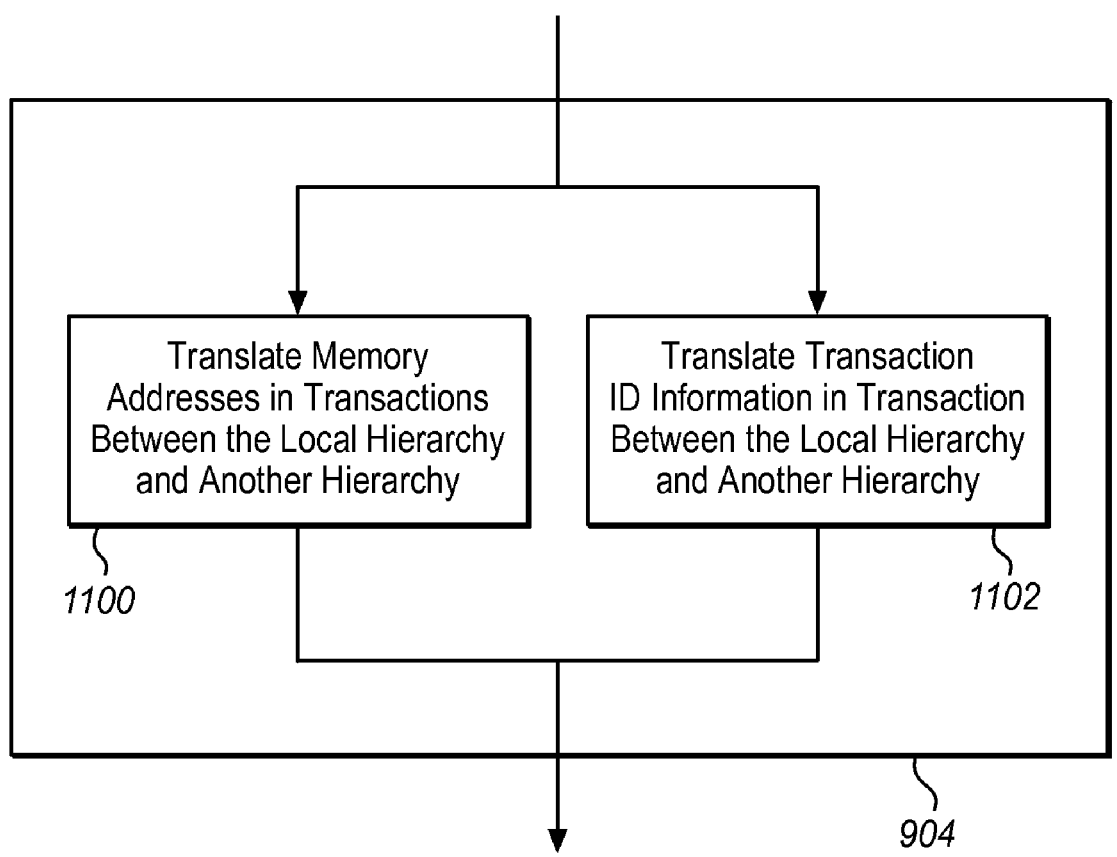

FIG. 10 provides exemplary additional details of the initialization processing discussed above with respect to element 902 of FIG. 9. Element 1000 represents processing to initialize each PCIe hierarchy to provide local access to its respective local components. Included in this initialization step is initialization of the cluster port of each PCIe hierarchy to respond to all non-local addresses. As discussed herein, the PCIe space is effectively partitioned by such initialization such that a first portion of memory addresses and transaction ID values is processed strictly locally within each hierarchy. A second portion of the PCIe space representing all other memory addresses and remaining transaction ID values not specifically reserved in the first portion is used to permit access by a first hierarchy to remote components within a second hierarchy. The cluster port in each hierarchy implements such partitioning of the PCIe space by exchanging transactions between first and second hierarchies through the intermediate PCIe switched fabric. Element 1002 then represents the partitioning of the PCIe space to configure a first portion representing local access by each hierarchy to its own local components. Element 1004 then represents any additional processing to further partition the PCIe space into a second portion through which each local hierarchy may access remote components of other hierarchies in the system.

More specifically, the cluster of PCIe hierarchies should be initialized so that memory address routed packets are only routed through the switched fabric and cluster ports based on the high order address bits 63 through 48. Therefore all PCIe switches in the clustered system should be initialized so that they forward packets based on 256 terabyte granularity (upstream, downstream, or peer-to-peer). A first issue considered in establishing this method of PCIe clustering is how the PCIe hierarchies are configured or enumerated. If the PCIe buses shown coupling the various hierarchies to the switched fabric were just connected together without the above noted routing configuration, then during PCI enumeration multiple root devices (of different hierarchies) would each try to configure devices in its local hierarchy as well as other local hierarchies across the cluster hierarchy. To prevent this, the PCIe cluster port for each local hierarchy looks like a PCIe endpoint from the point of view of the cluster hierarchy looking into a local hierarchy as mentioned earlier. This prevents a root device in one local hierarchy from configuring devices in another local hierarchy. A root device within a local hierarchy will start enumeration by configuring the devices within its local hierarchy with the configuration and memory space limitations described earlier. In addition to the enumeration of its local hierarchy, one root device of one local hierarchy that is connected as the root connection of the cluster hierarchy will also enumerate the cluster hierarchy since it will see this as an extension of its hierarchy. When the root device of each of the other local hierarchies attempt to enumerate the cluster hierarchy through their respective PCIe cluster port, the configuration packets they generate will be treated as unsupported packets since they will be sent to downstream ports of PCIe switches used in the cluster hierarchy. This will cause all these other root devices to stop enumeration at their boundary to the cluster hierarchy (i.e., at their respective cluster port). In this way only one root device enumerates the cluster hierarchy.

A second pass of enumeration is then run by each root device to set up their local switches (local to its hierarchy) to route all memory address routed packets with addresses greater than or equal to 256 terabytes and ID routed packets with bus numbers greater than 31 to their PCIe cluster port. In addition, the root device of the cluster hierarchy should run a second enumeration on the cluster hierarchy to set all bus numbers in the cluster hierarchy to values greater than 31. The additional enumeration is desirable since a typical PCI enumeration is unlikely to meet the requirement of this method of PCIe clustering.

Those of ordinary skill in the art will readily recognize numerous equivalent or additional steps that may be provided in methods associated with features and aspects hereof. FIGS. 9 and 10 are therefore intended merely as exemplary of typical processing to provide translation and mapping services in transactions between a first and second hierarchy in a clustered PCIe environment.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A system comprising:
a plurality of PCI Express controllers each comprising a PCI Express hierarchy, each hierarchy having an associated root controller, and each hierarchy having an associated cluster port; and
a PCI Express switch coupled to the cluster port of each hierarchy through a physical PCI Express bus, wherein the PCI Express switch is not multi-root aware ("MRA"),
wherein the cluster port of each hierarchy enables controlled access through the switch by a first hierarchy to components within any other hierarchy of the plurality of hierarchies, and
wherein the cluster port of each hierarchy partitions the PCI Express space of the system such that a first portion of the space is used within said each hierarchy to reference local components within said each hierarchy and such that a second portion of the space is used within said each hierarchy to reference remote components within other hierarchies of the plurality of hierarchies.

2. The system of claim 1
wherein the cluster port of each hierarchy further comprises:
a memory address mapping element for mapping memory addresses of the PCI Express space, the mapping element operable to translate memory addresses between addresses associated with local components of the first hierarchy containing the cluster port and addresses of remote components of another hierarchy.

3. The system of claim 2, wherein the memory address mapping element is a memory address translator,
wherein the memory address translator is adapted to associate each hierarchy other than the first hierarchy with a segment of the PCI Express space having a non-zero value in designated high order address bits of a memory address,
wherein the memory address translator is further adapted to associate local components of the first hierarchy with a segment of the PCI Express space having a zero value in the designated high order address bits, and wherein the designated high order address bits comprises a plurality of contiguous bits, the plurality of contiguous bits comprising a most significant bit but not a least significant bit.

4. The system of claim 1
wherein the cluster port of each hierarchy further comprises:
a configuration space translator for translating a PCI Express transaction ID in the PCI Express space, the translator operable to translate the transaction ID exchanged between the first hierarchy containing the cluster port and another hierarchy.

5. The system of claim 4
wherein the system is adapted to reserve a plurality of bits in one or more fields of the transaction ID, and
wherein the configuration space translator is adapted to save an original bus number of the transaction ID in the reserved bits.

6. The system of claim 5
wherein the system is adapted to reserve five bits from the one or more fields of the transaction ID.

7. The system of claim 5
wherein the system is adapted to reserve 3 bits in the bus number field of the transaction ID and 2 bits in the device number field of the transaction ID and 3 bits in the tag field of the transaction ID.

8. A cluster port in a PCI Express controller comprising a PCI Express hierarchy, the cluster port comprising:
a local interface to a PCI Express switch for coupling the cluster port to a local hierarchy;
a remote interface for coupling, through a physical PCI Express bus, the cluster port to remote components in one or more other PCI Express hierarchies;
a configuration store for storing PCI Express configuration information relating to the local hierarchy and relating to the other hierarchies; and
a translator element for translating PCI Express transactions between the local hierarchy and any of the other hierarchies, the translator element comprising a memory address mapping element for mapping memory addresses of the PCI Express space, the mapping element operable to translate memory addresses from addresses associated with local components of the local hierarchy to addresses associated with remote components of the other hierarchies,
wherein the cluster port enables controlled access between component of the local hierarchy and remote components within the one or more other hierarchies, and
wherein the cluster port is adapted to partition the PCI Express space of the system such that a first portion of the space is used within the local hierarchy to reference local components within local hierarchy and such that a second portion of the space is used to reference remote components within another of the other hierarchies.

9. The cluster port of claim 8, wherein the memory address mapping element is a memory address translator,
wherein the memory address translator is adapted to associate each other hierarchy with a segment of the PCI Express space having a non-zero value in designated high order address bits of a memory address,
wherein the memory address translator is further adapted to associate local components of the local hierarchy with a segment of the PCI Express space having a zero value in the designated high order address bits and wherein the designated high order address bits comprises a plurality of contiguous bits, the plurality of contiguous bits comprising a most significant bit but not a least significant bit.

10. The cluster port of claim 8
wherein the translator element further comprises:
a configuration space translator for translating a PCI Express transaction ID in the PCI Express space, the translator operable to translate the transaction ID exchanged between the local hierarchy and another hierarchy.

11. The cluster port of claim 10
wherein the cluster port is adapted to reserve a first plurality of bits in one or more fields of the transaction ID; and
wherein the cluster port is further adapted to use only a second plurality of bits in one field of the transaction ID to fully identify the local hierarchy by a particular hierarchy of the other hierarchies.

12. The cluster port of claim 11
wherein the cluster port is adapted to reserve eight bits from the one or more fields of the transaction ID.

13. The cluster port of claim 12
wherein the cluster port is adapted to reserve 3 bits in the bus number field of the transaction ID and 2 bits in the device number field of the transaction ID and 3 bits in the tag field of the transaction ID.

14. The cluster port of claim 8, wherein the remote interface couples with the remote components through another PCI Express switch.

15. A method comprising:
providing a plurality of PCI Express controllers, each controller comprising a hierarchy having an associated root controller and each hierarchy having an associated cluster port;
designating one hierarchy of the plurality of hierarchies as a supervisory hierarchy,
providing a PCI Express switch coupled to the cluster port of each hierarchy, wherein the PCI Express switch is not multi-root aware ("MRA");
configuring the cluster port of each hierarchy to permit access to selected components of said each hierarchy by other components of other hierarchies; and
accessing a component of another hierarchy from a first hierarchy through its corresponding cluster port.

16. The method of claim 15
wherein the step of configuring further comprises:
partitioning the PCI Express space of each hierarchy of the plurality of hierarchies such that a first portion of the space is used within said each hierarchy to reference local components within said each hierarchy and such that a second portion of the space is used within said each hierarchy to reference remote components within other hierarchies of the plurality of hierarchies.

17. The method of claim 16
wherein the step of accessing further comprises:
operating the cluster port to map memory addresses of the PCI Express space by translating memory addresses between addresses associated with local components of the first hierarchy containing the cluster port and addresses of remote components of another hierarchy.

18. The method of claim 16
wherein the step of accessing further comprises:
operating the cluster port to translate a PCI Express transaction ID exchanged between the first hierarchy containing the cluster port and another hierarchy.

19. The method of claim 16 wherein the step of configuring further comprises:

initializing each of the plurality of hierarchies to access components within its local hierarchy;

initializing the cluster port of said each hierarchy in accordance with the first and second portions defined by the step of partitioning; and initializing the PCI Express switch in accordance with the first and second portions defined by the step of partitioning.

20. The method of claim 19 wherein the step of initializing the PCI Express switch is performed by operation of the supervisory hierarchy.

* * * * *